(12) United States Patent
Zhang

(10) Patent No.: US 11,582,444 B2
(45) Date of Patent: Feb. 14, 2023

(54) INTRA-FRAME CODING METHOD AND APPARATUS, FRAME CODER, AND FRAME CODING SYSTEM

(71) Applicant: TENCENT TECHNOLOGY (SHENZHEN) COMPANY LIMITED, Shenzhen (CN)

(72) Inventor: Hongshun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/330,409

(22) Filed: May 26, 2021

(65) Prior Publication Data

US 2021/0281836 A1 Sep. 9, 2021

Related U.S. Application Data

(63) Continuation of application No. PCT/CN2019/126988, filed on Dec. 20, 2019.

(30) Foreign Application Priority Data

Dec. 29, 2018 (CN) .......................... 201811638336.5

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/176* (2014.11); *H04N 19/196* (2014.11); *H04N 19/11* (2014.11)

(58) Field of Classification Search
CPC .. H04N 19/105; H04N 19/139; H04N 19/176; H04N 19/196; H04N 19/11;
(Continued)

(56) References Cited

U.S. PATENT DOCUMENTS 10,785,479 B2 * 9/2020 Zhang .................. H04N 19/176
10,965,940 B2 * 3/2021 Li .......................... H04N 19/46
(Continued)

FOREIGN PATENT DOCUMENTS

CN 102665078 A 9/2012
CN 102986227 A 3/2013
(Continued)

OTHER PUBLICATIONS

The World Intellectual Property Organization (WIPO) International Search Report for PCT/CN2019/126988 dated Mar. 24, 2020 9 Pages (including translation).
(Continued)

*Primary Examiner* — Francis Geroleo
(74) *Attorney, Agent, or Firm* — Anova Law Group PLLC

(57) ABSTRACT

The present disclosure provides a method and an apparatus for determining an intra-frame prediction mode of a current video block. The method includes determining, in an image area including a to-be-coded current video block, reference modes of the current video block based on a plurality of intra-frame prediction modes of a plurality of second video blocks, the image area being in an area defined by an adjacent coding unit (CU) and a father CU corresponding to the current video block in a video frame or slice including the current video block; determining an alternative prediction mode set from preset intra-frame prediction modes, the alternative prediction mode set comprising a plurality of alternative prediction modes, including the reference modes; and determining, in the alternative prediction mode set, a prediction mode having optimal intra-frame prediction coding performance on the current video block as an intra-frame prediction mode of the current video block.

19 Claims, 9 Drawing Sheets

(51) Int. Cl.
*H04N 19/176* (2014.01)
*H04N 19/196* (2014.01)
*H04N 19/11* (2014.01)

(58) Field of Classification Search
CPC .... H04N 19/136; H04N 19/463; H04N 19/14; H04N 19/147; H04N 19/593
See application file for complete search history.

(56) References Cited

U.S. PATENT DOCUMENTS

| | | | |
|---|---|---|---|
| 11,044,471 B2* | 6/2021 | Lee | H04N 19/593 |
| 11,128,857 B2* | 9/2021 | Heo | H04N 19/105 |
| 2011/0292994 A1* | 12/2011 | Lim | H04N 19/593 |
| | | | 375/E7.126 |
| 2012/0177113 A1 | 7/2012 | Guo et al. | |
| 2013/0114712 A1 | 5/2013 | Yamamoto et al. | |
| 2014/0112388 A1 | 4/2014 | Lai | |
| 2017/0347094 A1 | 11/2017 | Su et al. | |
| 2018/0316913 A1* | 11/2018 | Jun | H04N 19/103 |
| 2019/0313092 A1 | 10/2019 | Han et al. | |
| 2020/0051288 A1 | 2/2020 | Lim et al. | |
| 2020/0099948 A1* | 3/2020 | Han | H04N 19/50 |
| 2020/0267382 A1* | 8/2020 | Li | H04N 19/593 |
| 2021/0203984 A1* | 7/2021 | Salehifar | H04N 19/132 |

FOREIGN PATENT DOCUMENTS

| | | |
|---|---|---|
| CN | 103220506 A | 7/2013 |
| CN | 103299622 A | 9/2013 |
| CN | 104168480 A | 11/2014 |
| CN | 104796701 A | 7/2015 |
| CN | 104883565 A | 9/2015 |
| CN | 104954788 A | 9/2015 |
| CN | 105657420 A | 6/2016 |
| CN | 107454403 A | 12/2017 |
| CN | 107623848 A | 1/2018 |
| CN | 108366256 A | 8/2018 |
| CN | 110213594 A | 9/2019 |
| KR | 20180040319 A | 4/2018 |
| WO | 2017188784 A2 | 11/2017 |
| WO | 2018119740 A1 | 7/2018 |

OTHER PUBLICATIONS

Ankur Saxena et al., "Jointly optimal intra prediction and adaptive primary transform," JCTVC-C108, Joint Collaborative Team on Video Coding (JCT-VC) of ITU-T SG16 WP3 and ISO/IEC JTC1/SC29/WG11 3rd Meeting: Guangzhou, CN, Oct. 15, 2010 (Oct. 15, 2010). 21 pages.

China National Intellectual Property Administration (CNIPA) Office Action 1 for 201811638336.5 dated May 16, 2022 11 Pages (including translation).

* cited by examiner

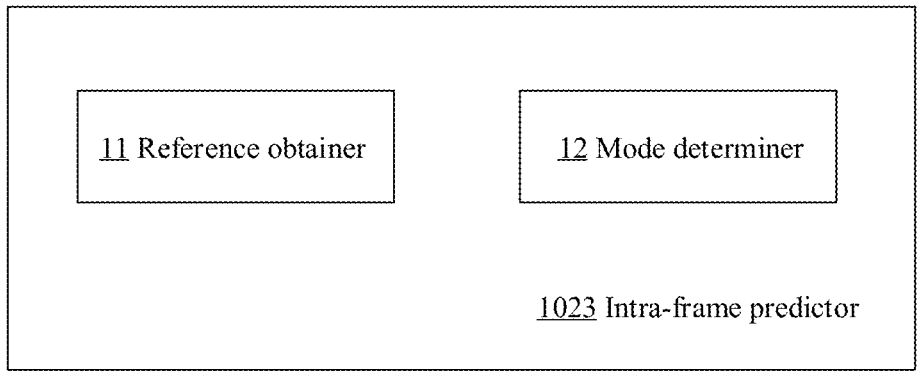

| Determine, in an image area in which a to-be-coded current video block is located, a plurality of intra-frame prediction modes of a plurality of second video blocks of which prediction modes have been determined as reference modes of the current video block | — 31 |

↓

| Determine an alternative prediction mode set from preset intra-frame prediction modes | — 32 |

↓

| Determine, in the alternative prediction mode set, a prediction mode having optimal performance in performing intra-frame prediction coding on the current video block as an intra-frame prediction mode of the current video block | — 33 |

FIG. 2C

| Prediction direction | | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Corresponding angle | | 32 | 26 | 21 | 17 | 13 | 9 | 5 | 2 | 0 | -2 | -5 | -9 | -13 | -17 | -21 | -26 |
| Prediction direction | 18 | 19 | 20 | 21 | 22 | 23 | 24 | 25 | 26 | 27 | 28 | 29 | 30 | 31 | 32 | 33 | 34 |
| Corresponding angle | -32 | -26 | -21 | -17 | -13 | -9 | -5 | -2 | 0 | 2 | 5 | 9 | 13 | 17 | 21 | 26 | 32 |

FIG. 5

INTRA-FRAME CODING METHOD AND APPARATUS, FRAME CODER, AND FRAME CODING SYSTEM

RELATED APPLICATIONS

This application is a continuation application of PCT Application No. PCT/CN2019/126988, filed on Dec. 20, 2019, which claims priority to Chinese patent application No. 201811638336.5, filed with the National Intellectual Property Administration, PRC on Dec. 29, 2018 and entitled "INTRA-FRAME CODING METHOD AND APPARATUS, FRAME CODER, FRAME CODING SYSTEM, AND COMPUTER-READABLE STORAGE MEDIUM". The two applications are incorporated herein by reference in their entirety.

FIELD OF THE TECHNOLOGY

This application relates to frame coding, and in particular, to an intra-frame coding method and apparatus, a frame coder, a frame coding system, and a computer-readable storage medium.

BACKGROUND OF THE DISCLOSURE

A digital video capability may be incorporated into a wide variety of apparatuses, such as a digital television, a digital live system, a wireless broadcasting system, a personal digital assistant (PDA), a laptop or desktop computer, a tablet computer, an ebook reader, a digital camera, a digital recording apparatus, a digital media player, a video game apparatus, a video game console, a cellular or satellite radio telephone, a smartphone, a video conference apparatus, a video stream apparatus, and another similar apparatus. An apparatus having the digital video capability implements a video compression technology, such as technologies described in standards defined by standards of MPEG-2, MPEG-4, ITU-TH.263, ITU-TH.264, MPEG-4 Part 10: advanced video coding (AVC), and high efficiency video coding (HEVC) and extension parts of the standards. The apparatus having the digital video capability may transmit, receive, code, decode, and/or store digital video information more efficiently by implementing such video compression technologies.

SUMMARY

Embodiments of the present disclosure provide an intra-frame coding method and apparatus, a frame coder, a frame coding system, and a computer-readable storage medium.

One aspect of the present disclosure provides a method for determining an intra-frame prediction mode of a current video block. The method includes determining, in an image area including a to-be-coded current video block, reference modes of the current video block based on a plurality of intra-frame prediction modes of a plurality of second video blocks of with determined prediction modes, the image area being in an area defined by an adjacent coding unit (CU) and a father CU corresponding to the current video block in a video frame or slice including the current video block; determining an alternative prediction mode set from preset intra-frame prediction modes, the alternative prediction mode set comprising a plurality of alternative prediction modes, including the reference modes; and determining, in the alternative prediction mode set, a prediction mode having optimal intra-frame prediction coding performance on the current video block as an intra-frame prediction mode of the current video block.

Another aspect of the present disclosure further provides an apparatus for determining an intra-frame prediction mode of a current video block. The apparatus includes a processor; and a memory, configured to store computer-executable instructions, the instructions, when executed in the processor, causing the processor to: determine, in an image area including a to-be-coded current video block, a plurality of intra-frame prediction modes of a plurality of second video blocks with determined prediction modes as reference modes of the current video block, the image area being in an area defined by an adjacent CU and a father CU corresponding to the current video block in a video frame or slice including the current video block; and determine an alternative prediction mode set from preset intra-frame prediction modes, the alternative prediction mode set comprising a plurality of alternative prediction modes including the reference modes; and determine, in the alternative prediction mode set, a prediction mode having optimal intra-frame prediction coding performance on the current video block as an intra-frame prediction mode of the current video block.

Another aspect of the present disclosure further provides a computer-readable storage medium, storing computer instructions, the computer-readable storage medium, when run on a computer, causing the computer to implement the method in the foregoing first aspect.

The embodiments of the present disclosure provide a low-complexity and accelerated video compression coding method without reducing compression performance, and complexity of an intra-frame predictor/coder/video coding and decoding system can be reduced when it is ensured that compression performance of the intra-frame predictor/coder/video coding and decoding system is not reduced, thereby increasing a coding speed and saving costs. In particular, the embodiments of the present disclosure are helpful for a live broadcast scenario or coding under high resolution.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 2B is a block diagram of an intra-frame predictor according to an embodiment of the present disclosure.

FIG. 2C is a flowchart of an intra-frame coding method according to an embodiment of the present disclosure.

FIG. 5 shows a mapping between an angle and a number of a directional prediction mode of an intra-frame prediction mode used in a HEVC standard.

DESCRIPTION OF EMBODIMENTS

To make the objectives, technical solutions, and advantages of this application clearer, the following further describes the implementations of this application in detail with reference to the accompanying drawings.

In the related art, determining of an intra-frame prediction mode used for intra-frame prediction coding may involve calculation of all intra-frame prediction modes. This is not sufficiently efficient, and especially for a coding standard having a large quantity of intra-frame prediction modes, computing resources are wasted. In addition, if any intra-frame prediction mode that needs to be calculated is selected, accuracy of intra-frame prediction may be affected, and an image compression loss is increased.

In video compression technologies, spatial (intra-frame) prediction and/or temporal (inter-frame) prediction is performed to reduce or remove redundancy inherent in a video sequence. For block-based video coding, a video slice (that is, a video frame or a part of a video frame) may be partitioned into several video blocks. The video block may also be referred to as a tree block, a coding unit (CU), and/or a coding node. All video blocks in an intra-frame type coding (I) slice of each video frame are coded by using spatial prediction relative to reference samples in adjacent video blocks in the same video frame. That is, each video block is coded in an intra-frame prediction mode, which is referred to as intra-frame coding in this specification. A video block in an inter-frame type coding (P or B) slice of each video frame is coded by using spatial prediction relative to reference samples in adjacent video blocks in the same video frame (that is, an intra-frame prediction mode is used for coding, which is referred to as intra-frame coding in this specification) or temporal prediction relative to reference samples in other reference video frames (that is, a motion vector is used for coding, which is referred to as inter-frame coding in this specification). The frame may also be referred to as a picture, and the reference frame may be referred to as a reference picture.

A to-be-coded prediction block is obtained through spatial or temporal prediction. Residual data indicates a pixel difference between a to-be-coded original video block and a prediction video block. An inter-coded block is coded according to a motion vector that points to a block of reference samples forming a prediction block and residual data that indicates a difference between a coded block and the prediction block. An intra-coded block is coded according to an intra-frame coding mode and residual data.

Figure 1:
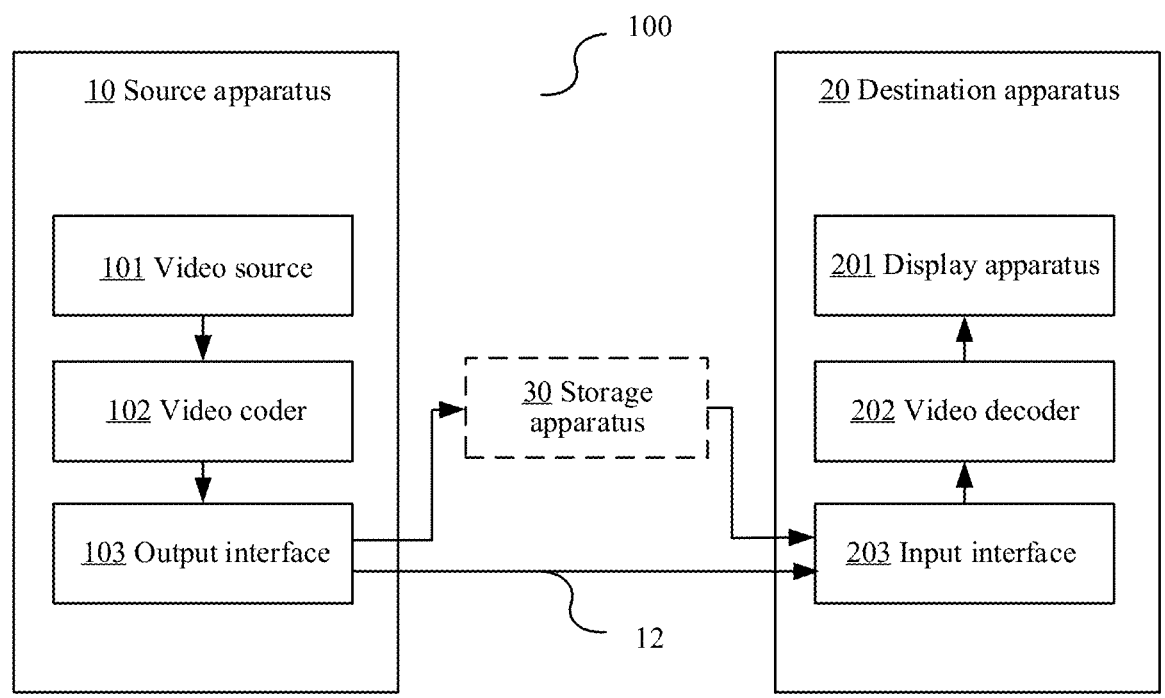
FIG. 1 is a block diagram of an exemplary video coding and decoding system according to an embodiment of the present disclosure.

FIG. 1 is a block diagram of an exemplary video coding and decoding system 100 according to an embodiment of the present disclosure. As shown in FIG. 1, the system 100 includes a source apparatus 10, the source apparatus 10 generates a coded video, and a destination apparatus 20 decodes the coded video subsequently. The source apparatus 10 and the destination apparatus 20 may include any one of a wide variety of apparatuses, for example, a digital television, a digital live system, a wireless broadcasting system, a PDA, a laptop or desktop computer, a tablet computer, an ebook reader, a digital camera, a digital recording apparatus, a digital media player, a video game apparatus, a video game console, a cellular or satellite radio telephone, a smartphone, a video conference apparatus, a video stream apparatus, and another similar apparatus. In some embodiments, the source apparatus 10 and the destination apparatus 20 may be configured for wireless communication. In some embodiments, the system 100 may be configured to support one-way or two-way video transmission, so as to support applications such as video streaming transmission, video replay, video broadcasting, and/or video telephony.

The destination apparatus 20 may receive to-be-decoded coded video data through a link 12. The link 12 may include any type of medium or apparatus that can move the coded video data from the source apparatus 10 to the destination apparatus 20. For example, the link 12 may include a communication medium to enable the source apparatus 10 to directly transmit the coded video data to the destination apparatus 20 in real time. The coded video data may be modulated according to a communication standard such as a wireless communication protocol, and transmitted to the destination apparatus 20. The communication medium may include any wireless and/or wired communication medium, for example, a radio frequency (RF) spectrum or one or more physical transmission lines. The communication medium may form a part of a packet-based network. For example, the network is a local area network, a wide area network, or the Internet. The communication medium may include a router, a switch, a base station, or any other device facilitating communication from the source apparatus 10 to the destination apparatus 20.

In some embodiments, the coded video data may be transmitted from an output interface 103 to a storage apparatus 30. Similarly, the coded video data may be read from the storage apparatus 30 through an input interface 203. The storage apparatus 30 may include any one of a plurality of distributed or locally read data storage media, for example, a hard disk drive, a Blu-ray, a DVD, a CD-ROM, a flash memory, a volatile or non-volatile memory, or any other suitable digital storage medium for storing coded video data. In another example, the storage apparatus 30 may correspond to a file server or another similar intermediate storage apparatus, and may store the coded video data generated by the source apparatus 10. The destination apparatus 20 may read the stored coded video data from the storage apparatus 30 through streaming transmission, download, or a combination of streaming transmission and download. The file server may be any type of a server that can store the coded video data and transmit the coded video data to the destination apparatus 20. Examples of the file server include a network server, a file transfer protocol (FTP) server, a network attached storage (NAS) apparatus, or a local disk drive. The destination apparatus 20 may read the coded video data through any standard data connection (including an Internet connection). The data connection may include a radio channel (for example, a Wi-Fi connection) that is suitable for reading the coded video data stored in the file server, a wired connection (for example, a DSL or a cable modem), or a combination of the radio channel and the wired connection.

In the example in FIG. 1, the source apparatus 10 includes a video source 101, a video coder 102, and an output interface 103. In some embodiments, the output interface 103 may include a modulator/demodulator (modem) and/or a transmitter. In the source apparatus 10, the video source 101 may include, for example, the following sources: a video capture apparatus such as a camera, a video file including a pre-captured video, a video input interface configured to receive a video from a video content provider or another device (including a cloud storage device) in a network, and/or a computer graphics system configured to generate a computer graph as a source video, and/or a combination of the sources. As an example, if the video source 101 is a camera, the source apparatus 10 and the destination apparatus 20 may be configured as a videotelephony apparatus.

The captured, pre-captured, received, or computer-generated video may be coded by the video coder 102. The coded video data may be directly transmitted to the destination apparatus 20 through the output interface 103 of the source apparatus 10. The coded video data may be alternatively stored in the storage apparatus 30 for subsequent reading by the destination apparatus 20 or another apparatus for decoding and/or playback.

The destination apparatus 20 includes an input interface 203, a video decoder 202, and a display apparatus 201. In some embodiments, the input interface 203 may include a receiver and/or a modem. The input interface 203 of the destination apparatus 20 receives coded video data through the link 12. The coded video data transmitted through the link 12 or provided by the storage apparatus 30 may include a plurality of syntactic elements generated by the video coder 102, for decoding the coded video data by a video decoder such as the video decoder 202. The syntactic elements may be transmitted on a communication medium together with the coded video data, stored in a storage medium or a file server, or the like.

The display apparatus 201 may be integrated with the destination apparatus 20 (as shown in FIG. 1) or outside the destination apparatus 20 (not shown). In other words, the destination apparatus 20 includes an integrated display apparatus, and/or is configured to be coupled to an external display apparatus. In some embodiments, the destination apparatus 20 may be a display apparatus. Generally, the display apparatus 201 displays decoded video data to a user, and may include any one of multiple types of display apparatuses such as a liquid crystal display (LCD), a plasma display, an organic light-emitting diode (OLED) display, or a display apparatus of another type.

The video coder 102 and the video decoder 202 may be separately implemented as any one of a variety of suitable coder and decoder circuits, for example, one or more microprocessors, a digital signal processor (DSP), an application-specific integrated circuit (ASIC), a field programmable gate array (FPGA), a discrete logic device, software, hardware, firmware, or any combination thereof. When the technologies are partially implemented in software, the corresponding video coder 102 and video decoder 202 may store an instruction for the software in a suitable non-transitory computer-readable storage medium and may execute an instruction in hardware by using one or more processors to perform the technologies of the present disclosure. Each of the video coder 102 and the video decoder 202 may be included in one or more other coders or decoders. Any one of the video coder or the video decoder may be integrated as a part of a combined coder/decoder (codec) in a corresponding apparatus.

The video coder 102 and the video decoder 202 may perform an operation based on a video compression standard such as a HEVC standard. However, the technologies of the present disclosure are not limited to any particular coding standard. Another example includes an ITU H.264 standard (or referred to as MPEG-4 Part 10: AVC), an MPEG-2 standard, and an ITU-T H.263 standard. Although not shown in FIG. 1, in some aspects, the video coder 102 and the video decoder 202 may be respectively integrated with an audio coder and decoder, and may include a suitable multiplexer-demultiplexer (MUX-DEMUX) or another piece of hardware and software, to process coding of audio and a video in the same data flow or a single data flow. If applicable, the MUX-DEMUX may conform to an ITU H.223 multiplexer protocol, or another protocol such as a user datagram protocol (UDP).

The HEVC is used as an example, and the HEVC inherits a classical block-based hybrid coding model since H.261. To compress a high-resolution video more efficiently, the HEVC provides three video content representation units with more flexibility, including: a CU, a prediction unit (PU), and a transform unit (TU). The CU has a concept similar to the concept of a macroblock in the H.264. In the HEVC, each frame of image is divided into non-overlapping coding tree units (CTU), the CTU is divided into CUs, a CU of the largest size is referred to as a largest coding unit (LCU), the size of the LCU is 64×64, and the depth of the LCU is defined as 0. Each CTU is recursively divided into four sub-CUs according to a quadtree. Each time the division is performed, the depth is increased by 1, and division is no longer performed when the size of the sub-CU reaches 8×8, that is, when the depth is 3. In the CU of each depth, intra-frame coding is performed by using a PU of the same size (for a PU of 8×8, there are a PU of 8×8 and a PU of 4×4). The HEVC supports PUs of a total of five sizes: 4×4, 8×8, 16×16, 32×32, and 64×64. The PU of each size has 35 prediction modes, including 33 directional prediction modes, one DC prediction mode, and one planar prediction mode. The planar mode resolves a gradient smooth texture area, is developed from a plane mode in the H.264/AVC, and is applicable to an area in which an image value changes slowly. A horizontal linear filter and a vertical linear filter are used for the planar mode, and an average value of results from the two linear filters is used as a predicted value of a current block pixel. The DC mode is applicable to a large-area planar area, and has the same method as that of the H.264/AVC, that is, a predicted value of a current block may be obtained through an average value of reference pixels on the left and top (not including the left top, the upper left, and the upper right) in the current block. For each PU, an optimal prediction mode is selected from the 35 prediction modes. After all CUs with different depths are traversed, an optimal division method and an intra-frame prediction mode of the CU are determined according to a rate-distortion value obtained through rate distortion optimization (RDO). The rate-distortion value may be a rate-distortion cost (RdCost).

$$RdCost = D + \lambda * b \quad (1)$$

where λ is a Lagrange constant, b is a quantity of codewords consumed for coding in a current mode, D represents a distortion function and has a plurality of forms, for example, a sum of squared differences (SSD), a sum of absolute transformed differences (SATD), and a sum of absolute differences (SAD), and the SSD corresponds to the highest complexity but is the most accurate, and the SATD comes second.

Embodiments of the present disclosure may be applicable to an apparatus generally meeting the HEVC standard. Embodiments of the present disclosure may be alternatively similarly applicable to another block-based coding and decoding technology. Certainly, the present disclosure is not limited thereto, but is intended to be applicable to any suitable coding and decoding technology.

In the present disclosure, "N×N" and "N by N" may be used interchangeably, to refer to a pixel size of a video block in aspects of vertical and horizontal dimensions, for example, a 16×16 pixel or a 16 by 16 pixel. Generally, a 16×16 block has 16 pixels (y=16) in the vertical direction and has 16 pixels (x=16) in the horizontal direction.

It is to be understood that FIG. 1 merely shows an exemplary system according to the present disclosure. However, the present disclosure is not limited to the system shown in FIG. 1, but may include any suitable and possible variant in a case of adding and/or reducing a component.

Figure 2A:
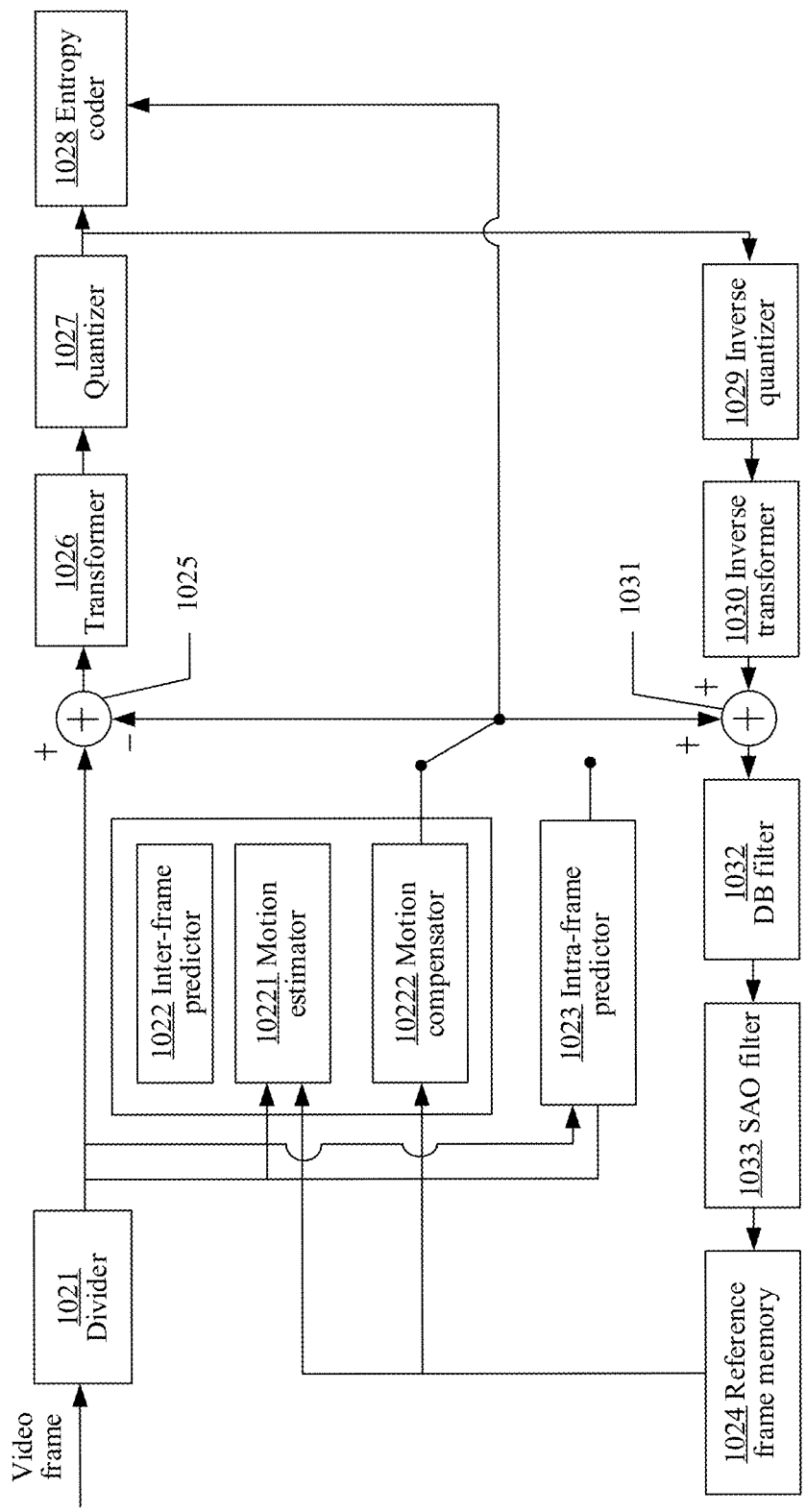
FIG. 2A is a block diagram of an exemplary video coder according to an embodiment of the present disclosure.

FIG. 2A is a block diagram of an exemplary video coder 102 according to an embodiment of the present disclosure. The video coder 102 may perform intra-frame coding and inter-frame coding on a video block in a video slice. The intra-frame coding depends on spatial prediction to reduce or remove spatial redundancy of a video in a given video frame or picture. The inter-frame coding depends on temporal prediction to reduce or remove temporal redundancy of a video in an adjacent frame or picture of a video sequence. An intra-coded frame (I-frame), an inter-coded frame (a P-frame, a B-frame, or a GBP-frame), and the like all have intra-coded blocks, that is, a block on which intra-frame coding is performed. The presence of the intra-coded block in the inter-coded frame is mainly to avoid the accumulation of errors of B-, P-, and GBP-frames, and also to meet a requirement of switching between scenarios. During inter-frame coding, reference pixels of inter-frame prediction are all based on reconstructed data of intra-frame coding. Therefore, the image quality of an intra-coded block is vital. If the image quality of an intra-coded block is poor, the quality of a video block that uses it as a reference becomes worse, leading to an increasingly large error. As a result, a bit stream coded with equal quality would be much larger, or image quality with an equal bit stream would be much worse.

In the example in FIG. 2A, the video coder 102 includes a divider 1021, an inter-frame predictor 1022 including a motion estimator 10221 and a motion compensator 10222, an intra-frame predictor 1023, a reference frame memory 1024, a first summator 1025, a transformer 1026, a quantizer 1027, and an entropy coder 1028. For video block reconstruction, the video coder 102 further includes an inverse quantizer 1029, an inverse transformer 1030, and a second summator 1031. One or more loop filters (in-loop or post-loop) such as a deblocking (DB) filter 1032 and a sample adaptive offset (SAO) filter 1033 may further be included for filtering a reconstructed video block. The one or more loop filters usually filter output of the second summator 1031. Alternatively, another loop filter (in-loop or post-loop) may be used.

As shown in FIG. 2A, the video coder 102 receives video data, and the divider 1021 divides the data into video blocks. The division may alternatively include division into slices or other relatively large units and division into video blocks. For example, the data is divided into video blocks of 4×4, 8×8, 16×16, 32×32, and 64×64 according to a quadtree structure of a CTU. Both the inter-frame predictor 1022 and the intra-frame predictor 1023 may select one of a plurality of possible inter-frame prediction modes or intra-frame prediction modes for a current video block based on an error result (for example, a coding rate and a distortion related parameter). As a part of selecting the intra-frame prediction mode, the intra-frame predictor 1023 is configured to perform first prediction according to the method of the embodiments of the present disclosure, to select first intra-frame prediction modes with relatively high possibilities, and determine a second intra-frame prediction mode based on the intra-frame prediction modes as an intra-frame prediction mode of the current video block. An output of the inter-frame predictor 1022 or the intra-frame predictor 1023 may be provided to the first summator 1025, and is combined with an output of a video block to generate residual block data, or an output of the inter-frame predictor 1022 or the intra-frame predictor 1023 may be provided to the second summator 1031, to reconstruct a video block for use as a reference frame.

The intra-frame predictor 1023 may perform intra-frame coding on the current video block relative to one or more adjacent video blocks in a frame or slice the same as a to-be-coded current video block to provide spatial compression. The motion estimator 10221 and the motion compensator 10222 in the inter-frame predictor 1022 perform inter-frame coding on the current video block relative to one or more prediction blocks in one or more reference frames to provide temporal compression.

When inter-frame prediction is selected for the current video block, the motion estimator 10221 may be configured to determine an inter-frame prediction mode of a video slice according to a predetermined mode of a video sequence. In the predetermined mode, the video slice in the sequence may be designated as a P-slice, a B-slice, or a GPB-slice. The motion estimator 10221 and the motion compensator 10222 may be highly integrated, but are separately described in this specification. A motion estimation performed by the motion estimator 10221 is a process of generating a motion vector for estimating the motion of a video block. For example, the motion vector may indicate a displacement of a PU of a video block in a current video frame relative to a prediction block in a reference picture.

The prediction block is a block that closely matches a PU of a to-be-coded video block in terms of a pixel difference, and the pixel difference may be determined through the SAD, the SSD, or another difference measurement. In some embodiments, the video coder 102 may calculate the value of an integer-fraction pixel location of a reference picture stored in the reference frame memory 1024. For example, the video coder 102 may interpolate the value of a quarter pixel location, a ⅛ pixel location, or another fractional pixel location of the reference picture. Therefore, the motion estimator 10221 may perform motion search relative to an integer pixel location and a fractional pixel location and output a motion vector that has fractional pixel precision.

The motion estimator 10221 calculates a motion vector of a PU of a video block in an inter-coded slice by comparing the location of the PU with the location of the prediction block of the reference picture. The motion estimator 10221 transmits the calculated motion vector to the entropy coder 1028 and the motion compensator 10222.

Motion compensation performed by the motion compensator 10222 may involve obtaining or generating the prediction block based on the motion vector determined through the motion estimation, and interpolation to sub-pixel precision may be performed. After receiving the motion vector of the PU of the current video block, the motion compensator 10222 may immediately determine a prediction block pointed to by the motion vector. The video coder 102 forms a pixel difference value by subtracting a pixel value of the prediction block from a pixel value of the current video block that is being coded, to form a residual video block. The first summator 1025 indicates a component performing this subtraction operation.

The intra-frame predictor 1023 is configured to perform intra-frame prediction on the current video block as an alternative to the inter-frame prediction performed by the motion estimator 10221 and the motion compensator 10222 as described above. Specifically, the intra-frame predictor 1023 is configured to determine an intra-frame prediction mode used for coding the current video block. The intra-frame prediction mode is usually an intra-frame prediction mode with an optimal coding rate and/or distortion performance determined after coding rate and/or distortion analysis. A further description of the intra-frame predictor 1023 is provided in detail below with reference to FIG. 3.

After the inter-frame predictor 1022 or the intra-frame predictor 1023 generates the prediction block of the current video block, the video coder 102 forms a residual block by subtracting the prediction block from the current video block. Residual video data in the residual block may be included in one or more TUs and be applied to the transformer 1026. The transformer 1026 transforms the residual video data into a residual transform coefficient by performing, for example, discrete cosine transform (DCT) or similar transform. The transformer 1026 is configured to convert the residual video data from a pixel domain into a transform domain, for example, a frequency domain.

The transformer 1026 is configured to transmit the obtained transform coefficient to the quantizer 1027. The quantizer 1027 quantizes the transform coefficient to further reduce a bit rate. A quantization process may generate a bit depth associated with some or all coefficients. A quantization degree may be modified by adjusting a quantization parameter. In some embodiments, the quantizer 1027 may then scan a matrix including the quantized transform coefficient. Alternatively, the entropy coder 1028 may perform scanning.

After quantization is performed, the entropy coder 1028 performs entropy coding on the quantized transform coefficient. For example, the entropy coder 1028 may perform context-adaptive variable-length coding (CAVLC), context-adaptive binary arithmetic coding (CABAC), syntax-based context-adaptive binary arithmetic coding (SBAC), probability interval partitioning entropy (PIPE) coding, or another entropy coding method or technology. The entropy coder further codes syntactic elements from the intra-frame predictor and the inter-frame predictor, for correct decoding by the video decoder 202. After the entropy coding is performed by the entropy coder 1028, a coded bit stream is transmitted to the video decoder 202 or the storage apparatus 30. The entropy coder 1028 is further configured to perform the entropy coding on a motion vector and the like of a current video slice that is being coded.

The inverse quantizer 1029 and the inverse transformer 1030 respectively apply inverse quantization and inverse transformation to the output of the quantizer 1027 in sequence to reconstruct the residual block in the pixel domain for subsequent use as a reference block of the reference picture. The motion compensator 10222 may calculate the reference block by adding the residual block to the prediction block of one of the reference pictures in one of reference picture lists. The motion compensator 10222 may further apply one or more interpolation filters to the reconstructed residual block to calculate a sub-integer pixel value for motion estimation. A summator 1031 adds the reconstructed residual block to a motion compensated prediction block generated by the motion compensator 10222 to generate a reference block for storage in the reference frame memory 1024. The reference block may be used by the motion estimator 10221 and the motion compensator 10222 as a reference block to perform inter-frame prediction on a block in a subsequent video frame or picture.

Apparently, FIG. 2A merely shows an exemplary video coder according to the present disclosure. However, the present disclosure is not limited to the video coder shown in FIG. 2A, but may include any suitable and possible variant in a case of adding and/or reducing a component.

FIG. 2B is a block diagram of an intra-frame predictor according to an embodiment of the present disclosure. In this embodiment, the intra-frame predictor 1023 includes a reference obtainer 11 and a mode determiner 12. The reference obtainer 11 may determine a reference mode of a to-be-coded current video block. The mode determiner 12 may determine an intra-frame prediction mode of the current video block according to the reference mode determined by the reference obtainer 11. Specific processing methods of the reference obtainer 11 and the mode determiner 12 are described as follows.

FIG. 2C is a flowchart of an intra-frame coding method according to an embodiment of the present disclosure. As shown in FIG. 2C, the method 30 may include the following steps:

Step 31. Determine, in an image area in which a to-be-coded current video block is located, a plurality of intra-frame prediction modes of a plurality of second video blocks of which prediction modes have been determined as reference modes of the current video block.

Step 32. Determine an alternative prediction mode set from preset intra-frame prediction modes.

The alternative prediction mode set includes a plurality of alternative prediction modes, and the plurality of alternative prediction modes include the reference modes.

Step 33. Determine, in the alternative prediction mode set, a prediction mode having optimal performance in performing intra-frame prediction coding on the current video block as an intra-frame prediction mode of the current video block.

Performance measure of the intra-frame prediction coding may include at least one of the following: a coding rate and coding distortion. In some embodiments, the coding rate or the coding distortion may be used as an evaluation indicator of the performance. For example, a prediction mode having the highest coding rate or optimal distortion performance may be determined as the intra-frame prediction mode of the current video block. In some other embodiments, the coding rate and the coding distortion may be combined (in a preset method) for use as an evaluation indicator of the performance. For example, weighting and combination may be performed on the coding rate performance and the coding distortion performance by using a combination algorithm preset as required, and a prediction mode having an optimal performance indicator after being combined may be determined as the intra-frame prediction mode of the current video block.

The current video block is an image block that is used as a video CU and is obtained by performing area division on a video image by using a video coding standard. For example, the video block may be a CU of any node in a CTU, or may be a PU, a TU, or the like in a CU.

The image area is located in an area defined by an adjacent CU and a Father CU that are of a CU corresponding to the current video block in a video frame or slice to which the current video block belongs.

The adjacent CU of the CU is another CU adjacent to a CU in a video image. In some embodiments, only some adjacent CUs may be added to the image area according to a coding sequence of the used video block. For example, when the coding sequence is from left to right and from top to bottom, only adjacent CUs on the left, the upper left, and the top of the CU corresponding to the current video block may be added to the image area, that is, the image area may not include adjacent CUs that are on the right, the lower right, and bottom and have obviously not been coded.

The father CU of the CU is an upper-level CU with a larger area to which the CU belongs when level-by-level division is performed on an image frame, for example, a parent CU of a CU corresponding to the current video block in a CTU.

In view of the above, in some embodiments, the plurality of second video blocks may include at least one of the following:

at least one CU adjacent to the CU corresponding to the current video block in the video frame or slice;

the father CU of the CU corresponding to the current video block;

a child CU in the CU corresponding to the current video block; and a PU adjacent to the CU corresponding to the current video block in the video frame or slice.

In the image area in which the current video block is located, intra-frame prediction modes that have been determined and are of other video blocks are searched, the used intra-frame prediction modes are used as a reference for determining the intra-frame prediction mode of the current video block, and the efficiency of determining the intra-frame prediction mode may be improved by using a possible content similarity in an adjacent area in image data.

In some embodiments, in step 32, the reference modes may be directly used as the alternative prediction mode set. In some other embodiments, some other prediction modes of which prediction directions are close to prediction directions of the reference modes may also be added to the alternative prediction mode set. That is, one or more direction intervals into which prediction directions of the reference modes fall may be determined in a prediction direction set corresponding to the preset intra-frame prediction modes, and intra-frame prediction modes corresponding to the one or more direction intervals are added to the alternative prediction mode set.

For example, in a plurality of preset direction intervals, one or more preset direction intervals into which the prediction directions of the reference modes fall may be determined as the one or more direction intervals. In this example, a plurality of direction intervals need to be preset. In some embodiments, the preset direction intervals may overlap with each other. In this case, one or more preset direction intervals into which all reference modes fall and that have the smallest total quantity of prediction modes may be used as direction intervals that need to be attempted, and a prediction mode corresponding to the one or more preset direction interval is added to a reference mode set. In some embodiments, the preset direction intervals may not overlap with each other, that is, a plurality of preset prediction directions may be divided into N subsets, and the N subsets are used as the plurality of preset direction intervals. Each subset is formed by a plurality of adjacent prediction directions, N being a positive integer greater than 1 and less than a quantity of directional prediction modes. The adjacent prediction directions are a plurality of continuously ranked prediction directions in a case that preset prediction directions are arranged according to angles. In some embodiments, the N subsets may be divided based on a vertical direction, a horizontal direction, and a diagonal direction.

In another example, one or more continuous direction intervals formed by the prediction directions of the reference modes and prediction directions adjacent to the prediction directions may be determined as the one or more direction intervals. The continuous direction interval is an interval formed by a plurality of continuously ranked prediction directions in a case that preset prediction directions are arranged according to angles. The direction interval may be determined according to the distribution of the prediction directions of the reference modes. For example, all prediction directions between a prediction direction with the smallest angle and a prediction direction with the largest angle in the reference modes are used as an attempt range of the prediction directions. In another example, a preset quantity of adjacent prediction directions on two sides of a prediction direction of each reference mode may be alternatively added to the attempt range. For example, when the preset quantity is 2, two prediction directions on each of the two sides of the prediction direction of each reference mode, that is, four adjacent prediction directions corresponding to each reference mode, may be added to the attempt range. A final direction interval may be determined according to the distribution of the prediction directions in the attempt range. In some embodiments, a direction interval between the smallest prediction direction and the largest prediction direction in the attempt range may be used as a to-be-attempted direction interval as a whole. In some other embodiments, the attempt range of the prediction directions may be divided into a plurality of direction intervals according to a preset threshold. For example, when the preset threshold is 3, the prediction directions in the attempt range are arranged according to angles, and there are preset prediction directions with a quantity exceeding the threshold (for example, there are four preset prediction directions 21 to 24 between 20 and 25 in FIG. 4) between two prediction directions in adjacent rankings (for example, 20 and 25 in FIG. 4), the two prediction directions may be divided into two different direction intervals, and boundaries of the two direction intervals are between the two prediction directions.

In some embodiments, a non-directional prediction mode is also a prediction mode with a relatively high possibility. Therefore, in some embodiments, if that the reference modes do not include a preset non-directional prediction mode, the non-directional prediction mode is added to the reference modes.

In some embodiments, the intra-frame prediction modes that have been determined in the image area may only include the non-directional prediction mode, that is, the reference modes do not include a directional prediction mode. In this case, intra-frame prediction modes corresponding to a preset quantity of prediction directions evenly selected from preset prediction directions may be added to the reference modes. In some embodiments, directional prediction modes corresponding to a vertical direction, a horizontal direction, and a diagonal direction may be selected.

In some embodiments, if there is a large quantity of prediction modes in the alternative prediction mode set, processing in step 33 may be divided into a coarse selection step and a fine selection step to improve efficiency. In a case that a total quantity of prediction modes in the alternative prediction mode set is greater than a preset threshold, first prediction modes with a quantity being not greater than the preset threshold may be selected from the alternative prediction mode set as attempted prediction modes in the coarse selection step. A second prediction mode having optimal performance in performing the intra-frame prediction coding on the current video block may be determined in the first prediction modes through the coarse selection for the fine selection. In the fine selection, the intra-frame prediction mode of the current video block may be determined in the alternative prediction mode set according to the second prediction mode. During the fine selection, the second prediction mode may be determined as the intra-frame prediction mode of the current video block in a case that the second prediction mode is the non-directional prediction mode. In a case that the second prediction mode is the directional prediction mode, in the second prediction mode and a prediction mode of which a prediction direction is adjacent to a prediction direction of the second prediction mode, the prediction mode having optimal performance in performing the intra-frame prediction coding on the current video block may be determined as the intra-frame prediction mode of the current video block.

Figure 3:
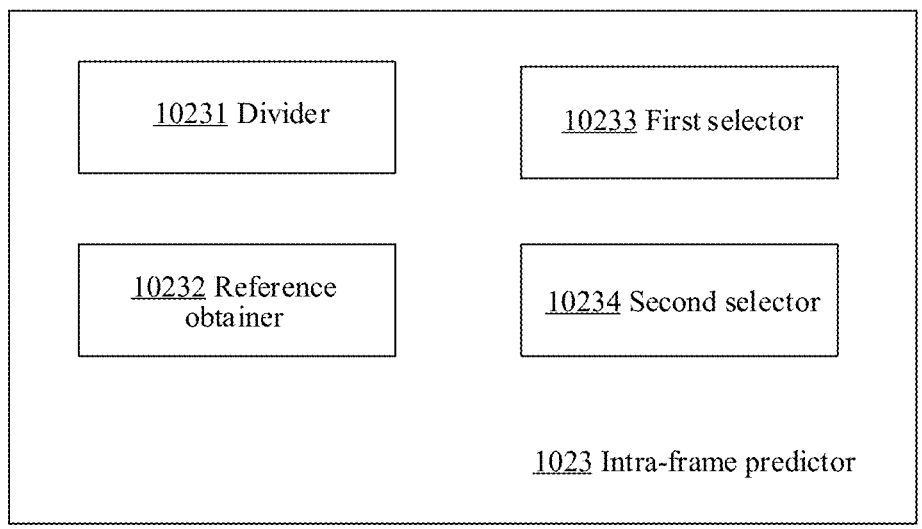
FIG. 3 is a block diagram of an intra-frame predictor according to an embodiment of the present disclosure.

A method in which a plurality of direction intervals are preset, one or more intervals are selected, and a prediction mode corresponding to a prediction direction in the one or more intervals is used as an alternative prediction mode is used as an example below for describing the solution of this application. FIG. 3 is a block diagram of an intra-frame predictor according to an embodiment of the present disclosure. An intra-frame predictor 1023 includes a divider 10231, a reference obtainer 10232, a first selector 10233, and a second selector 10234. Any one or any combination of the divider 10231, the reference obtainer 10232, the first selector 10233, and the second selector 10234 may be separately implemented as any one of a variety of suitable circuits, for example, one or more microprocessors, a DSP, an ASIC, an FPGA, a discrete logic device, software, hardware, firmware, or any combination thereof. When the components are partially or completely implemented in software, an instruction for the software may be stored in a memory (including one or more suitable non-transitory computer-readable storage media) and may execute an instruction in the memory by using one or more processors to perform the technologies of the present disclosure. The components may be alternatively included in one or more other coder components, or may be integrated in a codec.

Figure 4:
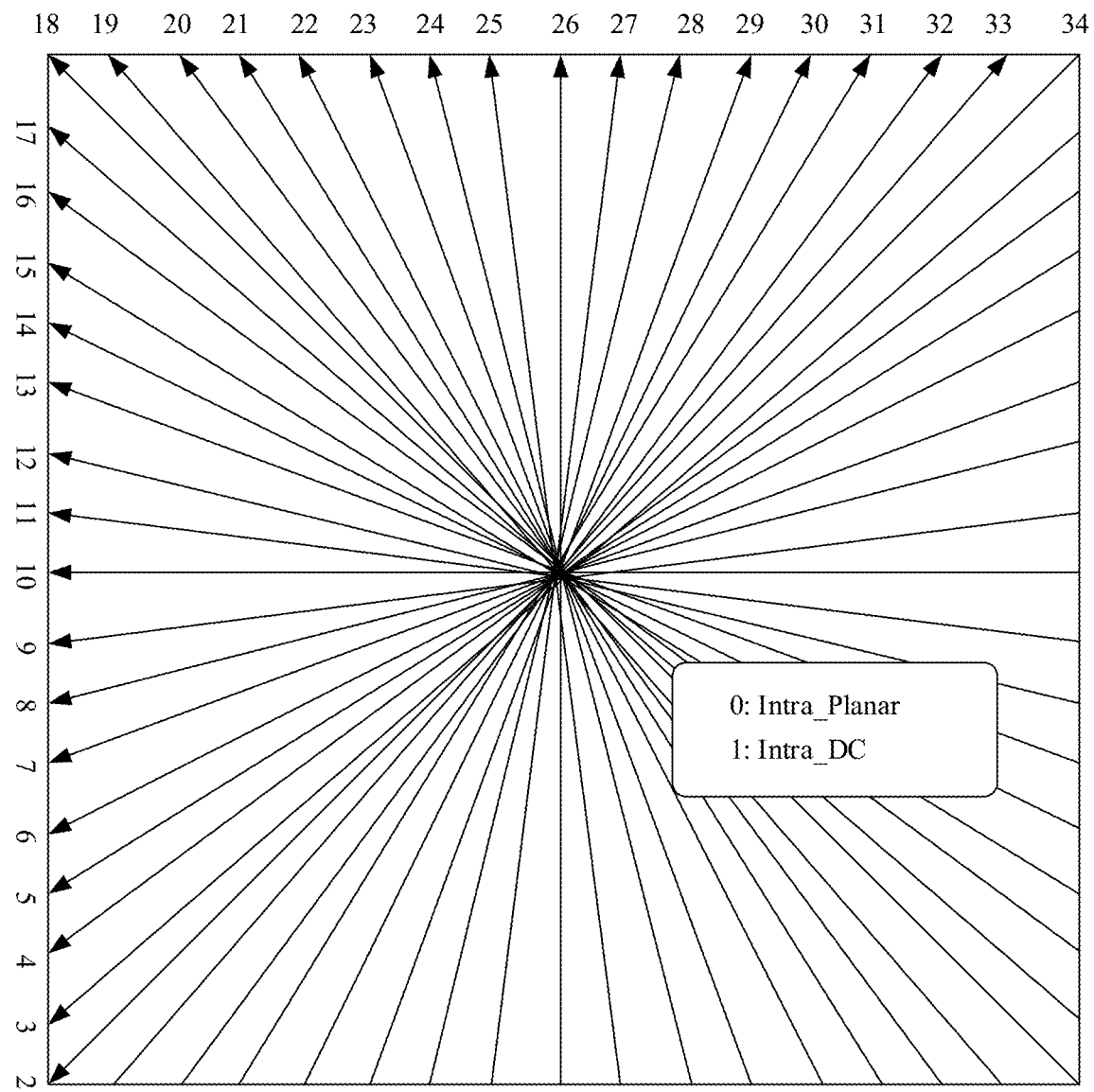
FIG. 4 shows an intra-frame prediction mode used in a HEVC standard.

The divider 10231 is configured to divide directional prediction modes of an intra-frame prediction mode into a plurality of subsets. In consideration of the consistency of frame texture, the division may be based on an adjacency relationship between directions, so that the directional prediction modes are divided into N subsets based on division of N continuous intervals in which all directions are located, N being a positive integer greater than 1 and less than a quantity of directional prediction modes. Referring to FIG. 4, in an example of 33 directional prediction modes in intra-frame prediction modes supported by the HEVC, 33 directions are divided into four continuous intervals according to five directions of the vertical direction 26, the horizontal direction 10, and the diagonal directions 2, 18, and 34, so that the 33 directional prediction modes are divided into four subsets, directional prediction modes corresponding to the directions 2 to 10 being divided to a first subset, directional prediction modes corresponding to the directions 11 to 18 being divided to a second subset, directional prediction modes corresponding to the directions 19 to 26 being divided to a third subset, and directional prediction modes corresponding to the directions 27 to 34 being divided to a fourth subset. It can be seen that the division of the four continuous intervals has rough symmetry.

In some embodiments, the rough symmetry is not essential, that is, an angle spanned by each direction interval may be adjusted between exemplary adjacent direction intervals. For example, in the example of the HEVC, directions with relatively large numbers (for example, directions 7 to 10) in a direction interval corresponding to the first subset may be adjusted into a direction interval corresponding to the adjacent second subset. Alternatively, in contrast, directions with relatively small numbers (for example, directions 11 to 14) in a direction interval corresponding to the second subset may be adjusted into a direction interval corresponding to the first subset.

In some embodiments, an average quantity of directions in an interval depends on a requirement for a granularity. In the example, the average quantity of directions in the interval is approximately 8. In another example, the average quantity may be alternatively another appropriate quantity, for example, 4, 5, or 6. Obviously, it is meaningless for the average quantity to be 33, and the average quantity certainly does not exceed 33. In an example of directional prediction modes supported by another standard such as H.264, such division may be made similarly.

The reference obtainer 10232 is configured to obtain a reference mode of an intra-frame prediction mode of a current video block. The reference mode includes a determined intra-frame prediction mode in a video coder, and there may be one or more intra-frame prediction modes in most cases. The determined intra-frame prediction mode is associated with the current video block, or associated with a video block associated with the current video block. For example, the determined intra-frame prediction mode may include the following types.

The first type is a determined intra-frame prediction mode of an adjacent CU, that is, a CU adjacent to a CU corresponding to the current video block. For example, a location relationship between the adjacent CU and the current video block depends on a scanning sequence. According to the HEVC protocol, the scanning sequence is basically in a "Z" shape. Therefore, the adjacent CU may be selected from an adjacent left CU, an adjacent top CU, and a left top CU (if any), and corresponding intra-frame prediction modes are respectively denoted as intra_mode_left, intra_mode_top, and intra_mode_lefttop. The adjacent CU herein is not limited to the same CTU and may be a CU adjacent to the current video block in an adjacent CTU.

The second type is a determined intra-frame prediction mode of a father CU of the current video block, there is only one father CU, and the intra-frame prediction mode of the father CU is denoted as intra_mode_father. The third type is a determined intra-frame prediction mode of a child CU of the current video block, and there may be a plurality of (for example, four) child CUs, and are respectively denoted as intra_mode_child_0, intra_mode_child_1, . . . , and intra_mode_child_n (n is a positive integer). Calculation of the intra-frame prediction mode of the father CU or the child CU is involved during division of code blocks. The intra-frame prediction mode of a father block is first calculated and an intra-frame prediction mode of a current block is then calculated, or the intra-frame prediction mode of the child CU is first calculated and an intra-frame prediction mode of a current block is then calculated. This depends on a frame type. In existing frame types, for example, an I-type, a B-type, and a P-type, the second type and the third type are not determined before the current video block. Therefore, only one of the second type and the third type in the reference model exists. However, a case that both the second type and the third type are determined before the intra-frame prediction mode of the current video block or after the intra-frame prediction mode of the current video block in a new frame type that may appear in the future is not excluded.

The fourth type is a most probable mode (MPM) of the current video block, and there may be one MPM and is denoted as MPM_mode, or there may be a plurality of MPMs and are respectively denoted as MPM_mode_0, MPM_mode_1, . . . , and MPM_mode_n. The MPM is described in protocols such as the H.264 and the HEVC. The H.264 supports one MPM. Since the HEVC supports more modes, a single MPM similar to the H.264 is not high in efficiency in the HEVC. The HEVC defines three MPMs for the size of each PU, and the selection depends on a mode selected by an adjacent PU. At the same time, since a probability distribution of modes other than the MPM is close to average, a mode may be alternatively designated from the remaining 32 modes by using a structure that is not represented by fixed-length coding of CABAC.

The selection of a MPM of the current video block is determined according to intra-frame prediction modes of adjacent PUs on the left and top of the current video block. In an embodiment, assuming that the intra-frame prediction modes of the adjacent PUs on the left and top are A and B, if A≠B, two modes MPM_mode_0 and MPM_mode_1 in the MPM are respectively set to A and B. The determining of the third mode MPM_mode_2 in the MPM needs to follow the following principles: (1) If neither A nor B is a planar mode, the MPM_mode_1 is set to the planar mode. (2) Otherwise, if neither A nor B is a DC mode, the MPM_mode_1 is set to the DC mode. (3) Otherwise (that is, one of A and B is a planar mode and the other of A and B is a DC mode), the MPM_mode_1 is set to a mode 26, that is, a vertical mode. If A=B, a method for determining the MPM is as follows: (1) If neither A nor B is a directional prediction mode, the MPM is separately set to the planar mode, the DC mode, and the vertical mode. (2) Otherwise, the MPM_mode_0 is set to A/B, and adjacent modes of A are selected for the MPM_mode_1 and the MPM_mode_2. The formula is as follows:

$$MPM\_mode\_1 = 2 + ((A-2-1+32)\%32) \quad (2)$$

$$MPM\_mode\_2 = 2 + ((A-2+1)\%32) \quad (3)$$

Based on the foregoing, in an example, the reference mode intra_mode_ref includes {intra_mode_father, intra_mode_left, intra_mode_lefttop, intra_mode_top, MPM_mode_0, MPM_mode_1, MPM_mode_2} or a subset thereof. In another example, the reference mode intra_mode_ref includes {intra_mode_child_0, intra_mode_child_1, intra_mode_child_2, intra_mode_child_3, intra_mode_left, intra_mode_lefttop, intra_mode_top, MPM_mode_0, MPM_mode_1, MPM_mode_2}, or a subset thereof.

In some embodiments, in another embodiment, the MPM is defined as including a determined intra-frame prediction mode of an adjacent PU, and any one is unavailable (for example, not yet determined) or does not exist (for example, the current block is at the edge of a video frame), and is not included in the MPM. For example, according to the scanning sequence of the HEVC, intra-frame prediction modes (if any) of PUs on the left and top are first determined, and the MPM defined in this way includes zero or two MPMs, and subsets thereof have three case of zero, one, or two MPMs. In this case, the value of the MPM may overlap with the intra-frame prediction mode of the adjacent CU.

Based on the foregoing, in an example, the reference mode intra_mode_ref includes {intra_mode_father, intra_mode_left, intra_mode_lefttop, intra_mode_top, MPM_mode_0, MPM_mode_1} or a subset thereof. In another example, the reference mode intra_mode_ref includes {intra_mode_child_0, intra_mode_child_1, intra_mode_child_2, intra_mode_child_3, intra_mode_left, intra_mode_lefttop, intra_mode_top, MPM_mode_0, MPM_mode_1}, or a subset thereof.

The embodiment of the present disclosure shown in FIG. 3 is applicable to intra-frame coding, including intra-frame type coding and intra-frame coding in inter-frame type coding. The intra-frame coding is used for all the first-type CU, second-type CU, and third-type CU, and intra-frame prediction modes thereof and a MPM of a current video frame may be used as the reference modes as long as the intra-frame prediction modes thereof and the MPM of the current video frame have been determined before the intra-frame prediction mode of the current video block. In a case that there are a plurality of intra-frame prediction modes in any one of available types, all or some of the plurality of intra-frame prediction modes may be selected to be added to the reference modes. For example, when corresponding four intra-frame prediction modes of four child CUs using the intra-frame coding are available, any zero to four intra-frame prediction mode in the four intra-frame prediction modes may be selected to be added to the reference modes. Certainly, if the intra-frame coding is not used for the father CU, the child CU, or the adjacent CU, it means that the intra-frame prediction mode thereof is unavailable.

The first selector 10233 is configured to select first intra-frame prediction modes from all (all possible) intra-frame prediction modes based on a relationship between the reference modes determined by the reference obtainer 10232 and the subset divided by the divider 10231, so that the second selector 10234 determines, based on the first intra-frame prediction modes, a second intra-frame prediction mode of the current video block as the intra-frame prediction mode of the current video block.

The following uses the HEVC as the background to describe the function of the first selector 10233 by using an example. In a first case, that is, a determined reference mode only includes a non-directional prediction mode, that is, for example, a planar mode and/or a DC mode in the HEVC standard, it is determined that the first intra-frame prediction modes include all non-directional prediction modes in the intra-frame prediction modes and one or more in the following directional prediction modes: a directional prediction mode corresponding to a vertical direction (the direction 26), a directional prediction mode corresponding to a horizontal direction (the direction 10), and directional prediction modes corresponding to diagonal directions (the directions 2, 18, and 34) in the intra-frame prediction modes. In an example, it is determined that the first intra-frame prediction modes include seven directional prediction modes, for example, the planar mode and the DC mode in the HEVC standard, and directional prediction modes corresponding to the directions 26, 10, 2, 18, and 24.

In some embodiments, in a second case, that is, the determined reference mode only includes a directional prediction mode corresponding to a direction belonging to the same continuous interval, it is determined that the first intra-frame prediction modes include all the non-directional prediction modes in the intra-frame prediction modes and directional prediction modes corresponding to all directions in the same continuous interval. In an example, the first intra-frame prediction modes include 11 directional prediction modes, for example, the planar mode and the DC mode in the HEVC standard, and directional prediction modes corresponding to the directions 2 to 10 in the first subset.

In some embodiments, in a third case, that is, the determined reference mode only includes a directional prediction mode corresponding to a direction of an intra-frame prediction mode belonging to two adjacent continuous intervals, it is determined that the first intra-frame prediction modes include all the non-directional prediction modes in the intra-frame prediction modes and directional prediction modes corresponding to all directions in the two adjacent continuous intervals. In an example, the first intra-frame prediction modes include 19 directional prediction modes, for example, the planar mode and the DC mode in the HEVC standard, and directional prediction modes corresponding to the directions 2 to 18 in the first subset and the second subset.

In some embodiments, in a fourth case, that is, the determined reference mode does not belong to any one of the cases, that is, the reference mode does not have direction consistency, there is no reference value, and the first intra-frame prediction modes need to be determined to include all 35 intra-frame prediction modes such as the HEVC standard.

The third case is generalized. In response to determining that the reference mode is included in a plurality of adjacent continuous intervals having no more than $$\left\lceil \frac{M}{2} \right\rceil$$

directions in total, it is determined that the first intra-frame prediction modes include all the non-directional prediction modes of the intra-frame prediction modes and directional prediction modes corresponding to all directions of the intra-frame prediction modes in the plurality of adjacent continuous intervals, M being a quantity of all directional prediction modes in the intra-frame prediction modes.

The fourth case is generalized. In response to determining that the reference mode is included in a plurality of adjacent continuous intervals having more than $$\left\lceil \frac{M}{2} \right\rceil$$

directions in total, it is determined that the first intra-frame prediction modes include all the intra-frame prediction modes.

$$\left\lceil \frac{M}{2} \right\rceil$$

is a mathematical expression in this specification, that is, $$\frac{M}{2}$$

is rounded up. For example, if the value of $$\frac{M}{2}$$

is 16.5, the value of $$\left\lceil \frac{M}{2} \right\rceil$$

is 17.

The second selector 10234 is configured to determine, based on a distortion related parameter and the first intra-frame prediction mode, the second intra-frame prediction mode as the intra-frame prediction mode of the current video block, to perform the intra-frame coding on the current video block. In this method, when accuracy of intra-frame prediction is ensured, a range of the intra-frame prediction modes targeted by the calculation of the distortion related parameter is reduced, thereby improving coding efficiency. In an example, the distortion related parameter is a rate-distortion cost. The calculation method of the rate-distortion cost has been provided in the description with reference to FIG. 1, and is not described herein again. Certainly, the upward reference does not mean any limitation on an execution subject of the calculation of the rate-distortion cost.

In an embodiment, the distortion related parameter (for example, the rate-distortion cost) is calculated for each first intra-frame prediction mode, and an intra-frame prediction mode with the smallest distortion related parameter is determined as the second intra-frame prediction mode, to perform the intra-frame coding on the current video block.

In another embodiment, when the first intra-frame prediction modes include directional prediction modes corresponding to a plurality of (for example, four or more) adjacent (for example, continuously numbered in the HEVC) prediction directions, for example, in the second case, the third case, and/or the fourth case, third intra-frame prediction modes may be determined. In an example, this may include: sampling all directional prediction modes in the first intra-frame prediction modes according to a number sequence of the prediction directions, and using all non-directional prediction modes and a sampling result as the third intra-frame prediction modes, so that the second intra-frame prediction mode is determined as the intra-frame prediction mode of the current video block based on the third intra-frame predictions, to perform the intra-frame coding on the current video block. In an example, the first intra-frame prediction modes include the 19 directional prediction modes, for example, the planar mode and the DC mode in the HEVC standard, and directional prediction modes corresponding to the directions 2 to 18. In this case, the directional prediction modes corresponding to the adjacent (for example, continuously numbered in the HEVC) directions 2 to 18 are sampled at an interval n=2, to obtain the directional prediction modes corresponding to the directions 2, 4, 6, . . . , and 18. The directional prediction modes, the planar mode, and the DC mode, that is, a total of 11 directional prediction modes, are used as the third intra-frame prediction modes, so that the second intra-frame prediction mode is further determined as the intra-frame prediction mode of the current video block based on the third intra-frame prediction modes, to perform the intra-frame coding on the current video block.

A method in which the second intra-frame prediction mode is determined from the third intra-frame prediction modes is that: distortion related parameters of all the third intra-frame prediction modes are calculated, an intra-frame prediction mode with the smallest distortion related parameter is determined in the third intra-frame prediction modes, and when it is determined that the intra-frame prediction mode with the smallest distortion related parameter in the third intra-frame prediction modes is a non-directional prediction mode, the non-directional prediction mode is determined as the second intra-frame prediction mode, to perform the intra-frame coding on the current video block. When it is determined that the intra-frame prediction mode with the smallest distortion related parameter in the third intra-frame prediction modes is a directional prediction mode, a directional prediction mode with the smallest distortion related parameter is selected from the directional prediction mode and directional prediction modes corresponding to two directions of which numbers are adjacent to that of a corresponding direction, and the directional prediction mode with the smallest distortion related parameter is determined as the second intra-frame prediction mode as the intra-frame prediction mode of the current video block, to perform the intra-frame coding on the current video block. In the foregoing example, when it is determined that a directional prediction mode corresponding to the direction 4 has the smallest distortion related parameter in all 11 third intra-frame prediction modes, distortion related parameters of directional prediction modes corresponding to the directions 3 and 5 adjacent to the direction 4 are calculated additionally, and the distortion related parameters are compared with that of the direction 4, to select the directional prediction mode with the smallest distortion related parameter to be determined as the second intra-frame prediction mode for use as the intra-frame prediction mode of the current video block. In this method, when the accuracy of the intra-frame prediction is ensured, the range of the intra-frame prediction modes targeted by the calculation of the distortion related parameter is further reduced, and coding complexity is further reduced, thereby improving coding efficiency.

Another method in which the second intra-frame prediction mode is determined from the third intra-frame prediction modes is that: distortion related parameters of all the third intra-frame prediction modes are calculated, and an intra-frame prediction mode with the smallest distortion related parameter in the third intra-frame prediction modes is determined as the second intra-frame prediction mode for use as the intra-frame prediction mode of the current video block. Similarly, this method also reduces the coding complexity and further improves the coding efficiency.

FIG. 4 shows an intra-frame prediction mode used in a HEVC standard, an arrow indicates a prediction direction, and a number indicates a direction number. Numbers and corresponding angles of 33 directions are provided in FIG. 5. Although the technology of the embodiments is described in the context of HEVC, it is to be understood that the present disclosure is not limited to the embodiment, but may be similarly applied to other appropriate video coding standards such as H.264.

According to the technologies of the present disclosure, when the video coder 102 codes a video block according to a standard such as the HEVC having a plurality of intra-frame direction coding modes, the video coder 102 may select the second intra-frame prediction mode from the first intra-frame prediction modes including intra-frame prediction modes less than all intra-frame prediction modes (for example, it is 35 in the HEVC) as the intra-frame prediction mode of the current video block, to perform the intra-frame coding on the current video block. This greatly reduces complexity of the intra-frame coding and improves coding efficiency. At the same time, although the quantity of the first intra-frame prediction modes is reduced, the accuracy of the intra-frame prediction is still ensured in consideration of direction consistency.

Figure 6:
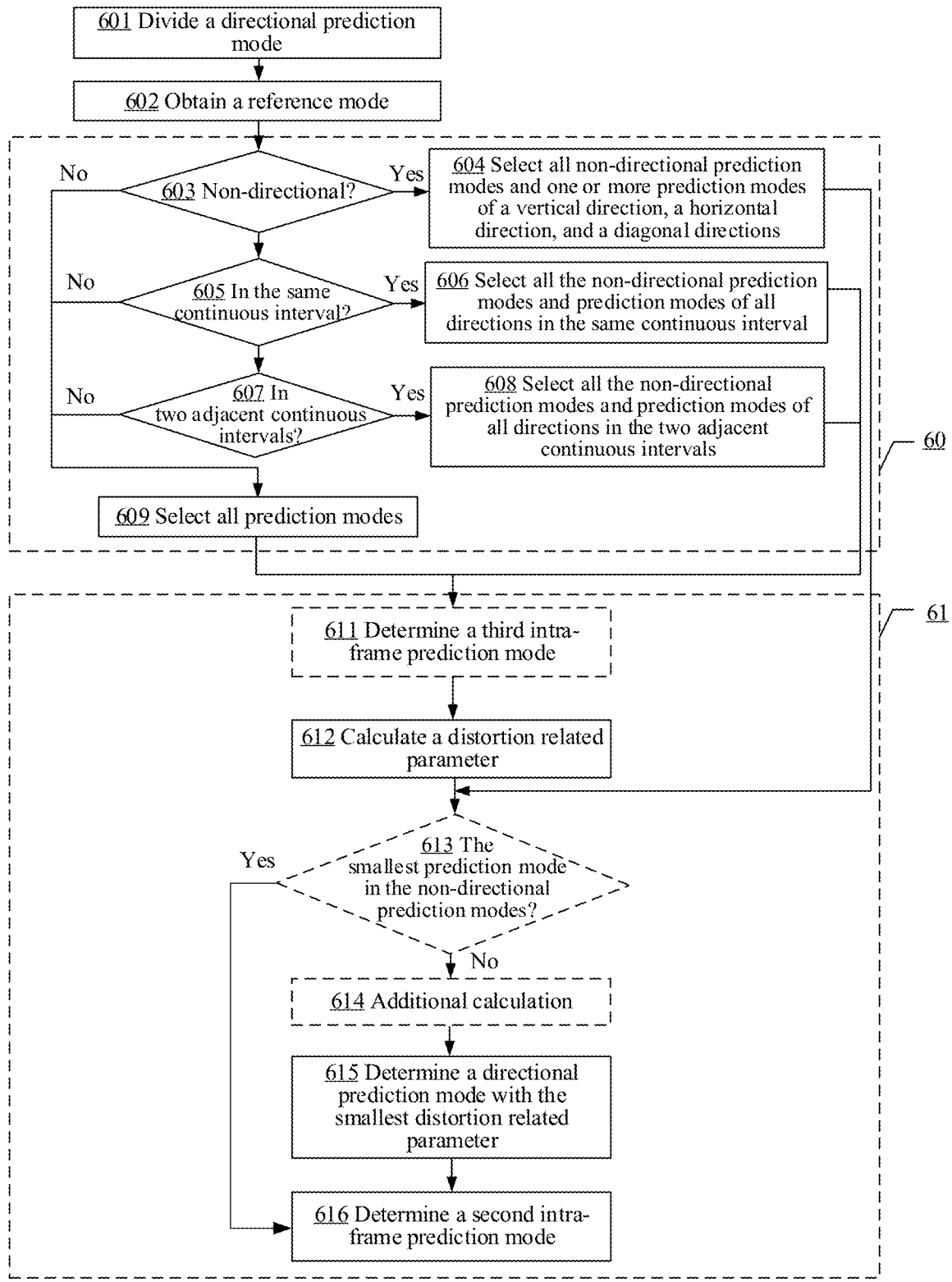
FIG. 6 is a flowchart of an intra-frame coding method according to an embodiment of the present disclosure.

FIG. 6 is a flowchart of an intra-frame coding method according to an embodiment of the present disclosure. For illustrative purposes, the method in FIG. 6 may be described with reference to FIG. 1 to FIG. 3, but other suitable types of video coding and decoding systems, video coders, and intra-frame predictors may also implement the method.

According to the intra-frame coding method in some embodiments of the present disclosure, starting from step 601, directional prediction modes in intra-frame prediction modes are divided into N subsets according to division of N continuous intervals in which directions thereof are located, N being a positive integer greater than 1 and less than a quantity of directional prediction modes. For a specific description of a division method, reference is made to a related description in the foregoing description of FIG. 3, and in particular, to the description of the divider 10231. Details are not described herein again. Certainly, the upward reference of the division method does not mean that an execution body of the division in step 601 is the divider 10231 in FIG. 3, but may be any suitable body, which is not limited in the step of the method. Step 602. Obtain a reference mode of an intra-frame prediction mode of a current video block. The reference mode includes a determined intra-frame prediction mode, and the determined intra-frame prediction mode is associated with the current video block, or associated with a video block associated with the current video block. For the structure of the reference mode, reference is made to the related description in the foregoing description of FIG. 3, and in particular, to the description of the reference obtainer 10232. Details are not described herein again. Certainly, the upward reference of the division method does not mean that an execution body of obtaining the reference mode in step 602 is the reference obtainer 10232 in FIG. 3, but may be any suitable body, which is not limited in the step of the method. An order of performing the foregoing step 601 and step 602 is not limited in this specification, and may be performed successively in any order, or may also be performed simultaneously.

Subsequently, one or more first intra-frame prediction modes need to be determined from all (all possible) intra-frame prediction modes based on a relationship between the obtained reference modes and the divided N subsets (which is 60 shown in FIG. 6), so that a second intra-frame prediction mode is determined as the intra-frame prediction mode of the current video block based on the first intra-frame prediction modes (which is 61 shown in FIG. 6). Specific steps are described below by using the HEVC as the background. Certainly, a person skilled in the art understands that the method is not limited to the standard, and may be similarly applicable to another compression coding standard. This is not limited in the present disclosure.

In a first case, that is, in step 602, it is determined that the reference mode only includes a non-directional prediction mode, that is, for example, a planar mode and/or a DC mode in the HEVC standard, in step 604, it is determined that the first intra-frame prediction modes include, for example, all non-directional prediction modes in the intra-frame prediction modes in the HEVC standard and one or more in the following directional prediction modes: a directional prediction mode corresponding to a vertical direction the direction 26), a directional prediction mode corresponding to a horizontal direction (the direction 10), and directional prediction modes corresponding to diagonal directions (the directions 2, 18, and 34). In an example, it is determined that the first intra-frame prediction modes include seven directional prediction modes, for example, the planar mode and the DC mode in the HEVC standard, and directional prediction modes corresponding to the directions 26, 10, 2, 18, and 24.

In a second case, that is, in step 605, it is determined that the reference mode only includes a directional prediction mode corresponding to a direction belonging to the same continuous interval, in step 606, it is determined that the first intra-frame prediction modes include all the non-directional prediction modes in the intra-frame prediction modes and directional prediction modes corresponding to all directions in the same continuous interval. In an example, the first intra-frame prediction modes include 11 directional prediction modes, for example, the planar mode and the DC mode in the HEVC standard, and directional prediction modes corresponding to the directions 2 to 10.

In a third case, that is, in step 607, it is determined that the reference mode only includes a directional prediction mode corresponding to a direction of an intra-frame prediction mode belonging to two adjacent continuous intervals, in step 608, it is determined that the first intra-frame prediction modes include all the non-directional prediction modes in the intra-frame prediction modes and directional prediction modes corresponding to all directions in the two adjacent continuous intervals. In an example, the first intra-frame prediction modes include 19 directional prediction modes, for example, the planar mode and the DC mode in the HEVC standard, and directional prediction modes corresponding to the directions 2 to 18.

In a fourth case, that is, the determined reference mode does not belong to any one of the cases, that is, the reference mode does not have direction consistency, there is no reference value, and in step 609, the first intra-frame prediction modes are determined to include all 35 intra-frame prediction modes such as the HEVC standard.

The third case is generalized. In response to determining that the reference mode is included in a plurality of adjacent continuous intervals having no more than $$\left\lceil \frac{M}{2} \right\rceil$$

directions in total, it is determined that the first intra-frame prediction modes include all the non-directional prediction modes of the intra-frame prediction modes and directional prediction modes corresponding to all directions of the intra-frame prediction modes in the plurality of adjacent continuous intervals, M being a quantity of all directional prediction modes in the intra-frame prediction modes.

The fourth case is generalized. In response to determining that the reference mode is included in a plurality of adjacent continuous intervals having more than $$\left\lceil \frac{M}{2} \right\rceil$$

directions in total, it is determined that the first intra-frame prediction modes include all the intra-frame prediction modes.

Step 612. Calculate distortion related parameters for currently selected intra-frame prediction modes, that is, the first intra-frame prediction modes. In an example, the distortion related parameter is a rate-distortion cost. The calculation method of the rate-distortion cost has been provided in the description with reference to FIG. 1, and is not described herein again. Certainly, the upward reference does not mean any limitation on an execution subject of the calculation of the rate-distortion cost. Next, in step 615, an intra-frame prediction mode with the smallest distortion related parameter is determined, and in step 616, the intra-frame prediction mode with the smallest distortion related parameter is determined as a second intra-frame prediction mode, to perform intra-frame coding on the current video block. In this method, when the accuracy of the intra-frame prediction is ensured, the range of the intra-frame prediction modes targeted by the calculation of the distortion related parameter is further reduced, and coding complexity is further reduced, thereby improving coding efficiency.

In another embodiment, when the first intra-frame prediction modes include directional prediction modes corresponding to a plurality of (for example, four or more) adjacent (for example, continuously numbered in the HEVC) prediction directions, for example, in the second case, the third case, and/or the fourth case, third intra-frame prediction modes may be determined in step 611. In an embodiment, this step may include: sampling all directional prediction modes in the first intra-frame prediction modes, and using all non-directional prediction modes of the intra-frame prediction modes and a sampling result as the third intra-frame prediction modes, so that the second intra-frame prediction mode is determined as the intra-frame prediction mode of the current video block based on the third intra-frame prediction modes. In an example, the first intra-frame prediction modes include the 19 directional prediction modes, for example, the planar mode and the DC mode in the HEVC standard, and directional prediction modes corresponding to the directions 2 to 18. In this case, the directional prediction modes corresponding to the adjacent (that is, continuously numbered in the HEVC) directions 2 to 18 are sampled at an interval n=2, to obtain the directional prediction modes corresponding to the directions 2, 4, 6, . . . , and 18. The directional prediction modes, the planar mode, and the DC mode, that is, a total of 11 directional prediction modes, are used as the third intra-frame prediction modes, so that the second intra-frame prediction mode is determined as the intra-frame prediction mode of the current video block based on the third intra-frame prediction modes, to perform the intra-frame coding on the current video block.

A method in which the second intra-frame prediction mode is determined from the third intra-frame prediction modes is that in step 612, distortion related parameters are calculated for currently selected intra-frame prediction modes, that is, the third intra-frame prediction modes. Therefore, an intra-frame prediction mode with the smallest distortion related parameter is obtained in the third intra-frame prediction modes, and when it is determined that the intra-frame prediction mode with the smallest distortion related parameter in the third intra-frame prediction modes is a non-directional prediction mode in step 613, the non-directional prediction mode is determined as the second intra-frame prediction mode, to perform the intra-frame coding on the current video block in step 616. When it is determined that the intra-frame prediction mode with the smallest distortion related parameter in the third intra-frame prediction modes is a directional prediction mode in step 613, distortion related parameters of directional prediction modes corresponding to two directions of which numbers are adjacent to that of a corresponding direction are calculated additionally in step 614, the directional prediction mode with the smallest distortion related parameter obtained in step 613 and step 614 is determined in step 615, and the directional prediction mode is determined as the second intra-frame prediction mode as the intra-frame prediction mode of the current video block in step 616. In the foregoing example, when it is determined that a directional prediction mode corresponding to the direction 4 has the smallest distortion related parameter in all 11 third intra-frame prediction modes in step 613, distortion related parameters of directional prediction modes corresponding to the directions 3 and 5 adjacent to the direction are calculated additionally in step 614, and the distortion related parameters are compared with that of the direction 4 in step 615, to select the directional prediction mode with the smallest distortion related parameter to be determined as the second intra-frame prediction mode for use as the intra-frame prediction mode of the current video block in step 616. In this method, when the accuracy of the intra-frame prediction is ensured, the range of the intra-frame prediction modes targeted by the calculation of the distortion related parameter is further reduced, and coding complexity is further reduced, thereby improving coding efficiency.

Another method in which the second intra-frame prediction mode is determined from the third intra-frame prediction modes is that: distortion related parameters of all the third intra-frame prediction modes are calculated in step 612, an intra-frame prediction mode with the smallest distortion related parameter is then determined in the third intra-frame prediction modes in step 615, and the intra-frame prediction mode with the smallest distortion related parameter is used as the second intra-frame prediction mode for use as the intra-frame prediction mode of the current video block in step 616. Similarly, this method also reduces the coding complexity and further improves the coding efficiency.

Figure 7:
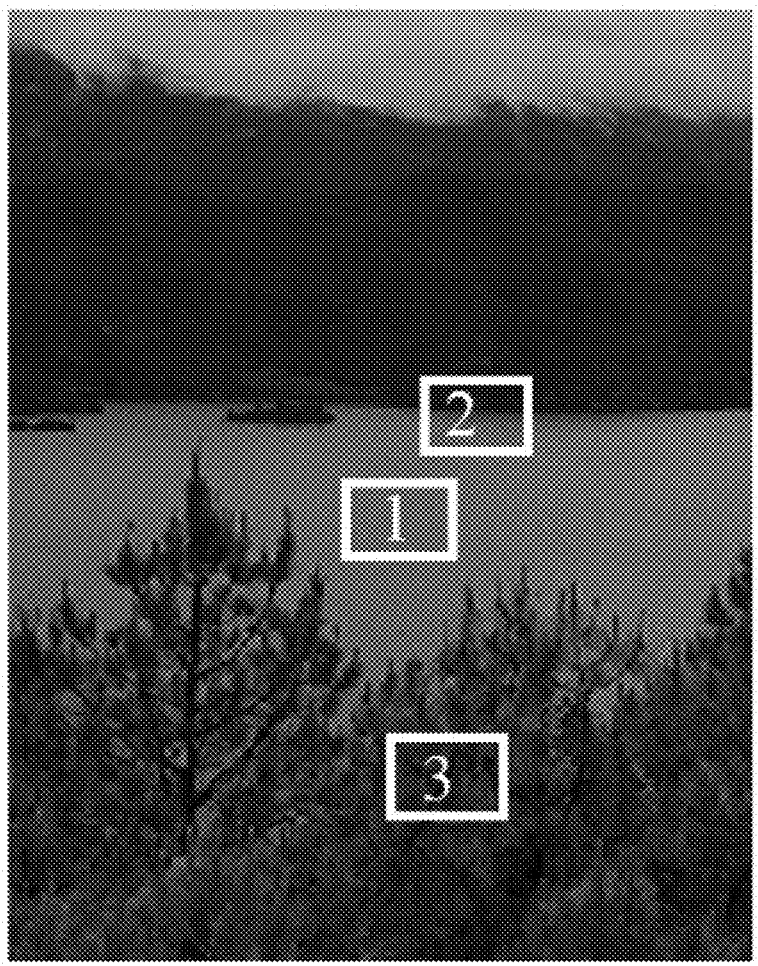
FIG. 7 shows an association between the method and a specific application according to an embodiment of the present disclosure.

FIG. 7 shows an association between the method and a specific application according to an embodiment of the present disclosure. A video block labelled 1 in FIG. 7 only includes a water surface, and water surface texture is consistent. It may be considered that only prediction of one direction is required. This corresponds to the second case in this specification, that is, the determined reference mode only includes the directional prediction mode corresponding to the direction belonging to the same continuous interval. A video block labelled 2 in FIG. 7 includes a water surface and a land, including a place in which different objects intersect. It may be considered that prediction of two directions is required. This corresponds to the third case in this specification, that is, the determined reference mode includes the directional prediction mode corresponding to the direction belonging to the two adjacent continuous intervals. A video block labeled 3 in FIG. 7 includes branches with different shapes, and there is no individual reference direction with reference value. This corresponds to the fourth case in this specification, that is, there is no direction consistency. The first intra-frame prediction modes need to be determined to include all, for example, 35 intra-frame prediction modes.

The embodiments of the present disclosure provide a low-complexity and accelerated video compression coding method without reducing compression performance, and complexity of an intra-frame predictor/coder/video coding and decoding system can be reduced when it is ensured that compression performance of the intra-frame predictor/coder/video coding and decoding system is not reduced, thereby increasing a coding speed and saving costs. In particular, the embodiments of the present disclosure are helpful for a live broadcast scenario or coding under high resolution.

The terms such as "first", "second", and "third" in the present disclosure do not indicate importance or a sequence of a step, and are merely used for distinguishing. The sequence of the method steps does not mean an execution sequence thereof, and the described method steps may be executed in a possible and reasonable order.

Figure 8:
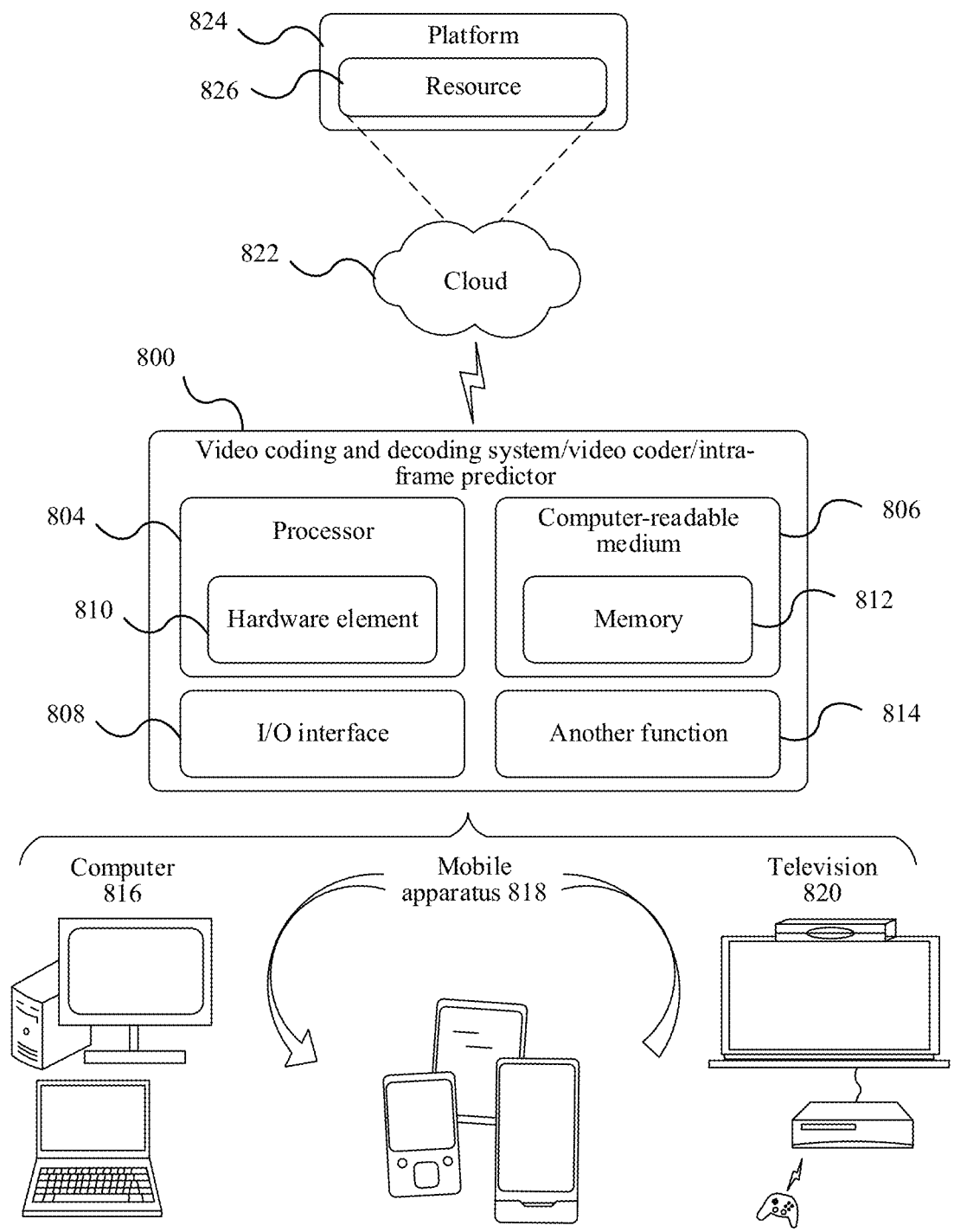
FIG. 8 is a diagram of a hardware environment according to an embodiment of the present disclosure.

Referring to FIG. 8, in an implementation of the present disclosure, a video coding and decoding system 100, a video coder 102, and/or an intra-frame predictor 1023 are collectively referred to as an apparatus 800, and may all include a processor 804, which includes a hardware element 810. The processor 804 includes one or more processors such as one or more DSPs, a general purpose microprocessor, an ASIC, an FPGA, or another equivalent integrated circuit or discrete logic circuit. The term "processor" used in this specification may refer to the foregoing structure, or any other structure that may be applied to implementation of the technologies described in this specification. In addition, in some aspects, the functions described in this specification, for example, referring to the method in FIG. 6, may be provided in a dedicated hardware and/or software module configured for coding and decoding, or may be incorporated into a combined codec. In addition, the technologies may be completely implemented in one or more circuits or logic elements. In the present disclosure, various elements (for example, "devices") are described to emphasize functions of an apparatus that is configured to implement the disclosed technologies, but the functions do not necessarily need to be implemented by different hardware units. However, as described above, various units may be combined in a codec hardware unit, or may be provided by a set of interoperable hardware units (including one or more processors described above) in combination with appropriate software and/or firmware.

The term unit (and other similar terms such as module, subunit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In one or more examples, the described functions may be implemented by using hardware, software, firmware, or any combination thereof. If the functions are implemented by using the software, the functions may be stored in a computer-readable medium as one or more instructions or code lines, or transmitted by a computer-readable medium 806, and are executed by a processor based on the hardware.

By way of example and not limitation, some computer-readable storage media may include a RAM, a ROM, an EEPROM, a CD-ROM, another optical disc storage or magnetic disk storage, another magnetic storage apparatus, a flash memory, or any other memory 812 that can store required program code in a form of an instruction or a data structure and can be read by a computer.

The video coding and decoding system 100, the video coder 102, and/or the intra-frame predictor 1023 further include an I/O interface for data transmission and another function 814. The video coding and decoding system 100, the video coder 102, and/or the intra-frame predictor 1023 may be included in different apparatuses, and only a computer 816, a mobile apparatus 818, and a television 820 are shown in the figure. Each of these configurations includes devices that may have generally different configurations and capabilities, and therefore, the video coding and decoding system 100, the video coder 102, and/or the intra-frame predictor 1023 may be configured according to one or more of different device categories. In addition, the technologies implemented in the present disclosure may also be implemented completely or partially on a "cloud" 822 by using a distributed system such as a platform 824.

It is to be understood that this application is not limited to the accurate structures that are described in the foregoing and that are shown in the accompanying drawings, and modifications and changes may be made without departing from the scope of this application. The scope of this application is limited by the appended claims only.

What is claimed is:

1. A method for determining an intra-frame prediction mode of a current video block, comprising:
   determining, in an image area including a to-be-coded current video block, reference modes of the current video block based on a plurality of intra-frame prediction modes of a plurality of second video blocks of with determined prediction modes, the image area being in an area defined by an adjacent coding unit (CU) and a father CU corresponding to the current video block in a video frame or slice including the current video block;
   determining an alternative prediction mode set from preset intra-frame prediction modes, the alternative prediction mode set comprising a plurality of alternative prediction modes, including the reference modes and
   determining, in the alternative prediction mode set, a prediction mode having optimal intra-frame prediction coding performance on the current video block as an intra-frame prediction mode of the current video block, including:
      selecting, when a total quantity of prediction modes in the alternative prediction mode set is greater than a preset threshold, first prediction modes with a quantity not greater than the preset threshold from the alternative prediction mode set;
      determining, in the first prediction modes, a second prediction mode having optimal intra-frame prediction coding performance on the current video block; and
      determining the intra-frame prediction mode of the current video block in the alternative prediction mode set according to the second prediction mode.

2. The method according to claim 1, wherein the plurality of second video blocks comprises at least one of the following:
   at least one CU adjacent to the CU corresponding to the current video block in the video frame or slice;
   the father CU of the CU corresponding to the current video block;
   a child CU in the CU corresponding to the current video block; and
   a prediction unit (PU) adjacent to the CU corresponding to the current video block in the video frame or slice.

3. The method according to claim 1, further comprising:
   adding, when the reference modes do not comprise a preset non-directional prediction mode, the non-directional prediction mode to the reference modes.

4. The method according to claim 1, further comprising:
   adding, when the reference modes do not comprise a directional prediction mode, intra-frame prediction modes corresponding to a preset quantity of prediction directions evenly selected from preset prediction directions to the reference modes.

5. The method according to claim 4, wherein the intra-frame prediction modes corresponding to the preset quantity of selected intra-frame prediction directions comprise: directional prediction modes corresponding to a vertical direction, a horizontal direction, and a diagonal direction.

6. The method according to claim 1, wherein the determining the intra-frame prediction mode of the current video block in the alternative prediction mode set according to the second prediction mode comprises:
   determining the second prediction mode as the intra-frame prediction mode of the current video block when the second prediction mode is the non-directional prediction mode.

7. The method according to claim 1, wherein the determining the intra-frame prediction mode of the current video block in the alternative prediction mode set according to the second prediction mode comprises:
   determining, in the second prediction mode and a prediction mode of which a prediction direction is adjacent to a prediction direction of the second prediction mode when the second prediction mode is the directional prediction mode, the prediction mode having optimal intra-frame prediction coding performance on the current video block as the intra-frame prediction mode of the current video block.

8. The method according to claim 1, wherein the coding performance comprises at least one of the following: a coding rate and a coding distortion.

9. The method according to claim 1, wherein determining the alternative prediction mode set comprises:
   dividing a plurality of preset prediction directions into N subsets, each subset indicating a direction interval formed by one or more adjacent prediction directions, N being an integer greater than 1 and less than a quantity of directional prediction modes, and the adjacent prediction directions of at least one of the N subsets including continuously ranked prediction directions arranged according to angles;
   determining, in the N subsets corresponding to the preset intra-frame prediction modes, one or more direction intervals into which prediction directions of the reference modes fall; and
   adding intra-frame prediction modes corresponding to the one or more direction intervals to the alternative prediction mode set.

10. The method according to claim 9, wherein the N subsets are divided based on a vertical direction, a horizontal direction, and a diagonal direction.

11. An apparatus for determining an intra-frame prediction mode of a current video block, comprising:
    a processor; and
    a memory, configured to store computer-executable instructions, the instructions, when executed by the processor, causing the processor to:
    determine, in an image area including a to-be-coded current video block, a plurality of intra-frame prediction modes of a plurality of second video blocks with determined prediction modes as reference modes of the current video block, the image area being in an area defined by an adjacent CU and a father CU corresponding to the current video block in a video frame or slice including the current video block and
    determine an alternative prediction mode set from preset intra-frame prediction modes, the alternative prediction mode set comprising a plurality of alternative prediction modes including the reference modes; and
    determine, in the alternative prediction mode set, a prediction mode having optimal intra-frame prediction coding performance on the current video block as an intra-frame prediction mode of the current video block, including:
　selecting, when a total quantity of prediction modes in the alternative prediction mode set is greater than a preset threshold, first prediction modes with a quantity not greater than the preset threshold from the alternative prediction mode set;
　determining, in the first prediction modes, a second prediction mode having optimal intra-frame prediction coding performance on the current video block; and
　determining the intra-frame prediction mode of the current video block in the alternative prediction mode set according to the second prediction mode.

12. The apparatus according to claim 11, wherein the determining the intra-frame prediction mode of the current video block in the alternative prediction mode set according to the second prediction mode comprises:
　determining the second prediction mode as the intra-frame prediction mode of the current video block when the second prediction mode is the non-directional prediction mode.

13. The apparatus according to claim 11, wherein the determining the intra-frame prediction mode of the current video block in the alternative prediction mode set according to the second prediction mode comprises:
　determining, in the second prediction mode and a prediction mode of which a prediction direction is adjacent to a prediction direction of the second prediction mode when the second prediction mode is the directional prediction mode, the prediction mode having optimal intra-frame prediction coding performance on the current video block as the intra-frame prediction mode of the current video block.

14. The apparatus according to claim 11, wherein when determining the alternative prediction mode set, the processor is further configured to:
　divide a plurality of preset prediction directions into N subsets, each subset indicating a direction interval formed by one or more adjacent prediction directions, N being an integer greater than 1 and less than a quantity of directional prediction modes, and the adjacent prediction directions of at least one of the N subsets including continuously ranked prediction directions arranged according to angles;
　determine, in the N subsets corresponding to the preset intra-frame prediction modes, one or more direction intervals into which prediction directions of the reference modes fall; and
　add intra-frame prediction modes corresponding to the one or more direction intervals to the alternative prediction mode set.

15. A non-transitory computer-readable storage medium, storing computer-readable instructions, the instructions being executable by one or more processors to implement a method comprising:
　determining, in an image area including a to-be-coded current video block, reference modes of the current video block based on a plurality of intra-frame prediction modes of a plurality of second video blocks of with determined prediction modes, the image area being in an area defined by an adjacent coding unit (CU) and a Father CU corresponding to the current video block in a video frame or slice including the current video block;
　determining an alternative prediction mode set from preset intra-frame prediction modes, the alternative prediction mode set comprising a plurality of alternative prediction modes, including the reference modes; and
　determining, in the alternative prediction mode set, a prediction mode having optimal intra-frame prediction coding performance on the current video block as an intra-frame prediction mode of the current video block, including:
　　selecting, when a total quantity of prediction modes in the alternative prediction mode set is greater than a preset threshold, first prediction modes with a quantity not greater than the preset threshold from the alternative prediction mode set;
　　determining, in the first prediction modes, a second prediction mode having optimal intra-frame prediction coding performance on the current video block; and
　　determining the intra-frame prediction mode of the current video block in the alternative prediction mode set according to the second prediction mode.

16. The computer-readable storage medium according to claim 15, wherein the determining an alternative prediction mode set from preset intra-frame prediction modes comprises:
　determining, in a prediction direction set corresponding to the preset intra-frame prediction modes, one or more direction intervals into which prediction directions of the reference modes fall; and
　adding intra-frame prediction modes corresponding to the one or more direction intervals to the alternative prediction mode set.

17. The computer-readable storage medium to claim 16, wherein the determining one or more direction intervals into which prediction directions of the reference modes fall comprises:
　determining, in a plurality of preset direction intervals, one or more preset direction intervals into which the prediction directions of the reference modes fall as the one or more direction intervals.

18. The computer-readable storage medium according to claim 17, the method further comprising:
　dividing a plurality of preset prediction directions into N subsets, each subset being formed by a plurality of adjacent prediction directions, N being a positive integer greater than 1 and less than a quantity of directional prediction modes, the adjacent prediction directions being a plurality of continuously ranked prediction directions when preset prediction directions are arranged according to angles; and
　using the N subsets as the plurality of preset direction intervals.

19. The computer-readable storage medium according to claim 16, wherein the determining one or more direction intervals into which prediction directions of the reference modes fall comprises:
　determining one or more continuous direction intervals formed by the prediction directions of the reference modes and prediction directions adjacent to the prediction directions as the one or more direction intervals, the continuous direction interval being an interval formed by a plurality of continuously ranked prediction directions when preset prediction directions are arranged according to angles.

\* \* \* \* \*